(12) United States Patent
Payrat et al.

(10) Patent No.: US 7,906,989 B2
(45) Date of Patent: Mar. 15, 2011

(54) APPARATUS FOR DETECTING A USB HOST

(75) Inventors: Eric Payrat, Simiane-Collongue (FR);
Majid Kaabouch, Rousset (FR)

(73) Assignee: Atmel Rousset S.A.S., Rousset Cedex (FR)

( * ) Notice: Subject to any disclaimer, the term of this patent is extended or adjusted under 35 U.S.C. 154(b) by 439 days.

(21) Appl. No.: 12/051,935

(22) Filed: Mar. 20, 2008

(65) Prior Publication Data

US 2009/0240843 A1 Sep. 24, 2009

(51) Int. Cl.
*H03K 19/094* (2006.01)

(52) U.S. Cl. .................. 326/86; 326/87; 326/21; 710/16; 710/18

(58) Field of Classification Search .................... 326/62, 326/68, 86, 87, 82; 710/15–19, 313
See application file for complete search history.

(56) References Cited

U.S. PATENT DOCUMENTS

| | | |
|---|---|---|
| 2006/0000917 A1* | 1/2006 | Kim et al. ................ 235/492 |
| 2006/0075152 A1* | 4/2006 | Zhu ............................ 710/15 |
| 2007/0030035 A1* | 2/2007 | Komatsu et al. ............ 327/65 |

* cited by examiner

*Primary Examiner* — Rexford N Barnie
*Assistant Examiner* — Jany Tran
(74) *Attorney, Agent, or Firm* — Schwegman, Lundberg & Woessner, P.A.

(57) ABSTRACT

A multi-interface integrated circuit (IC) comprises a plurality of transistors, and a level detection block. At least one transistor of the plurality of transistors is in communication with a first terminal and either a first or a second lead of the multi-interface IC, and at least one of the plurality of transistors is in communication with the first terminal, a second terminal and either the first or a second lead of the multi-interface IC. The level detection block is in communication with at least one of the plurality of transistors and the first and second leads.

15 Claims, 2 Drawing Sheets

APPARATUS FOR DETECTING A USB HOST

FIELD OF INVENTION

The present invention is related to detection of a universal serial bus (USB) host.

BACKGROUND

In multi-interface integrated circuit (IC) devices, such as smart card devices that include an ISO-7816 operating mode and a USB operating mode, it is necessary to detect which type of interface is connected to the device. In the case, for example, where the USB interface is not used and the USB host is not connected, the USB pads, (designated D+ and D−), which are associated with the USB host being connected, are left floating on the USB interface side. This floating state of the D+ and D− pads tends to result in an increased power consumption in the IC device and may even render it non-functional. Additionally, software that is embedded in the IC device requires knowledge of the presence of the USB host to activate or deactivate the USB software associated with the IC device, which may cause an additional power drain.

Currently, to perform detection of a USB host, an IC device includes pull-up resistors connected between a power supply and the D+ and D− leads through switches. The USB host, on the other hand, includes pull-down resistors that connect the D+ and D− leads to ground terminals. The pull-down resistors are significantly less resistive than the pull-up resistors. Therefore, if the USB host is present, then D+ and D− are tied to ground through the pull-down resistors, whereas if the USB host is not present, D+ and D− are tied to the power supply via the pull-up resistors. The use of resistors, however, requires a significant amount of physical space to accommodate them, as well as a significant amount of power to drive current through them.

SUMMARY

An apparatus embodiment for detecting the presence of a universal serial bus (USB) host connection to a multi-interface integrated circuit (IC) is disclosed. The apparatus embodiment includes a multi-interface integrated circuit (IC) comprising a plurality of transistors and a level detection block. At least one transistor of the plurality of transistors is in communication with a first terminal and either a first or a second lead of the multi-interface IC, and at least one of the plurality of transistors is in communication with the first terminal, a second terminal and either the first or a second lead of the multi-interface IC. The level detection block is in communication with at least one of the plurality of transistors and the first and second leads.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF EXAMPLE EMBODIMENTS

Embodiments of the present invention will be described with reference to the figures wherein like numerals represent like elements throughout.

The Multi-Interface IC Device

Figure 1:
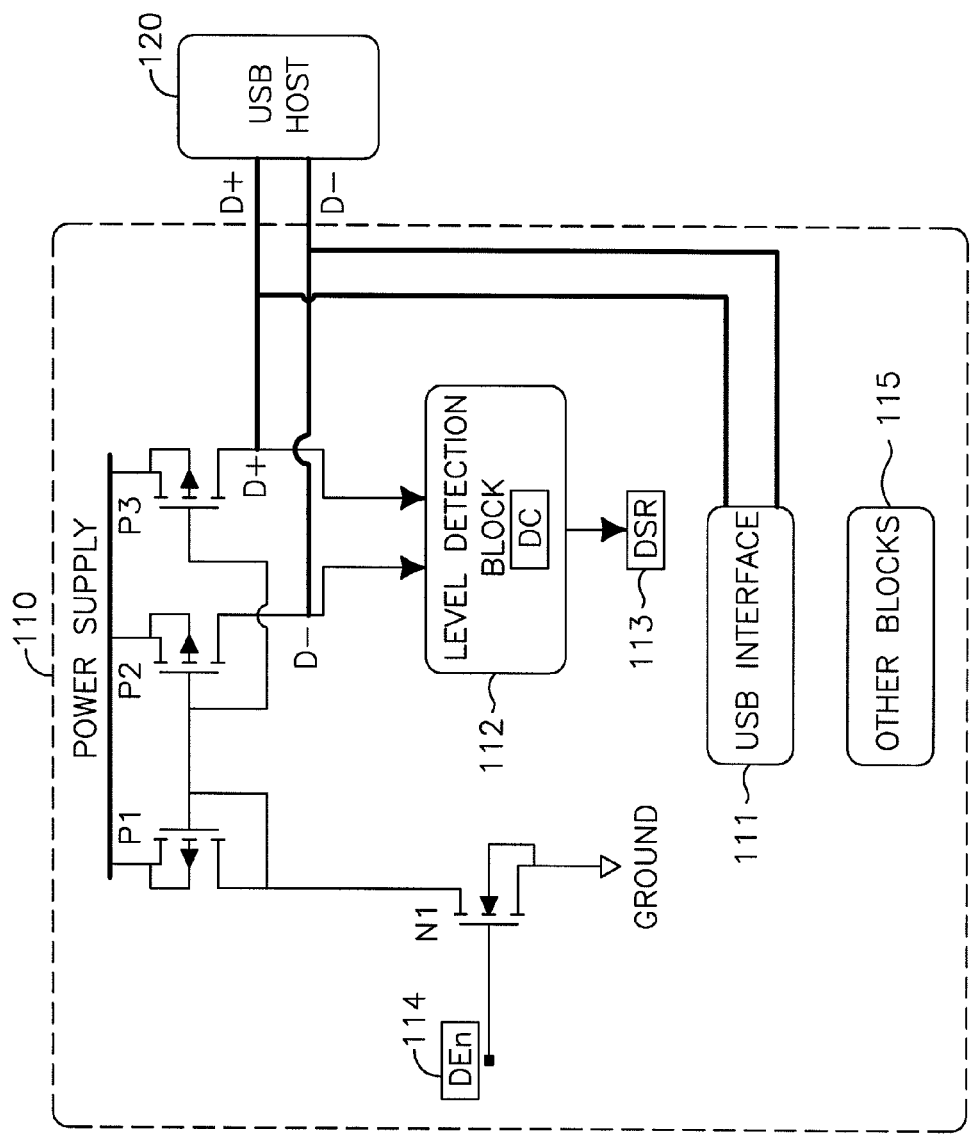
FIG. 1 is a block diagram of a multi-interface IC device in accordance with an embodiment of the invention.

In accordance with an embodiment of the invention, FIG. 1 is a block diagram of a multi-interface IC device 110, capable of connection with a USB host 120. The IC interface 110 includes a USB interface block 111, a level detection block 112, a detection status register (DSR) 113, a detection enable block (DEn) 114, a plurality of P metal oxide semiconductor (MOS) transistors (designated P1, P2, and P3), an NMOS transistor (designated N1), a first terminal, which for example, may be a power supply, and other functional blocks 115. Although three PMOS transistors and one NMOS transistor are shown in an example configuration, other numbers and configurations of transistors may be utilized. The multi-interface IC device 110 may also include a central processing unit (CPU) to control the circuitry depicted in the multi-interface IC device 110. The transistors N1, P1, P2, and P3 may be selected such that they have low power consumption requirements. The USB interface block 111 may represent an IP block that manages USB data transfer between the CPU and the HOST via the D+ and D− physical interface. The other functional blocks 115 may include peripherals to the CPU.

As shown in FIG. 1, DEn 114 is connected to the gate of N1, the source of N1 is connected to a second terminal, which for example, may be ground, and the drain of N1 is connected to the gates of P1, P2, and P3, as well as the drain of P1. The sources of P1, P2, and P3 are connected to the power supply. The drains of P2 and P3 are connected to D− and D+, respectively, which, in turn are connected to the level detection block 112 and the USB interface block 111. The level detection block 112 includes an internal detection counter (DC) that may be incremented as the level detection block 112 is in the process of detecting for the presence of the USB host 120.

USB Host Detection Method

Figure 2:
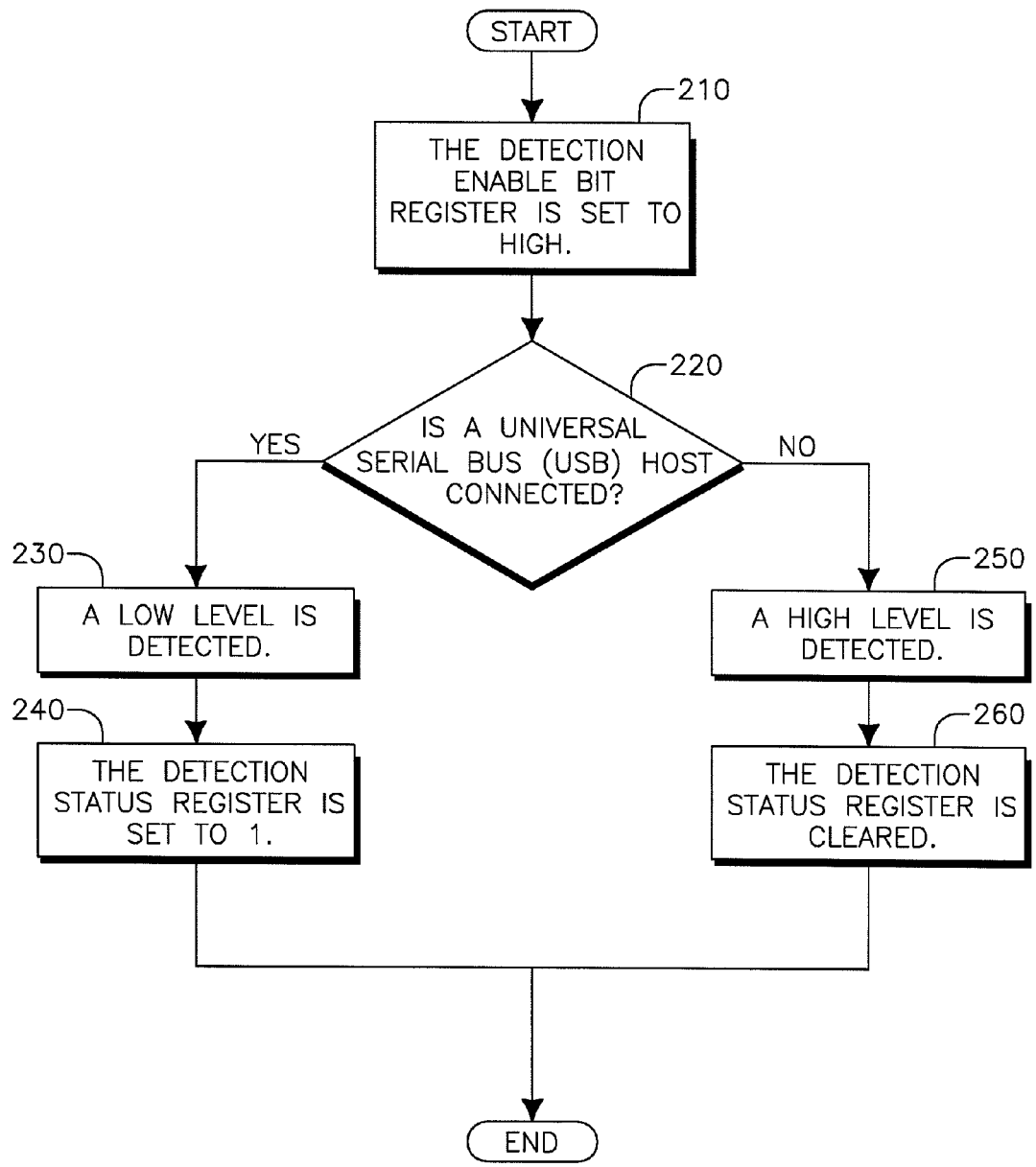
FIG. 2 is a flow diagram of a method embodiment of detecting a USB host, in accordance with an embodiment of the invention.

FIG. 2 is a flow diagram of a method embodiment 200 of detecting the USB host 120, in accordance with an embodiment of the present invention. In step 210, a bit in the DEn block 114 is set to high, or "1". This setting may be controlled by a CPU (not shown) or other mechanism. When the DEn bit is set to high, N1 is activated, or turned on. As a result of N1 being activated, P1, which controls the current sources to P2 and P3, is activated. By virtue of P1 being activated, P2 and P3 are activated, or turned on. This enables USB host detection. When the DEn bit is low, then P1, P2, and P3 remain deactivated. In this case, USB host detection is disabled.

If USB host detection is enabled, and therefore transistors P2 and P3 are turned on, then it is determined whether or not the USB host 120 is connected (step 220). This determination may occur by the level detection block 112 sampling D+ and D− on each positive or negative edge of the CPU clock during a number "N" of CPU cycles. In one example, N=64. If the USB host 120 is present, then a first level at D+ and D−, which may be a low level, will be detected (step 230) due to D+ and D− being connected to ground via the pull-down resistors in the USB host 120 (not shown). In this case, the DSR 113 is set to a first value, such as "1" (step 240), indicating the presence of the USB host 120.

If the USB host 120 is not present, then a second level at D+ and D−, which may be a high level, will be detected (step 250) due to D+ and D− having the voltage level of the power supply through P3 and P2, respectively, since transistors P3 and P2 are activated when USB host detection is enabled. The DSR 113 is then set to a second value, which may include clearing the DSR (step 260). Similarly, if only one of D+ or D− is detected at the first level described above, and the other of D+ or D− is detected at the second level, then the DSR 113 is set to the second value.

Other alternative method embodiments, and variations of the method embodiment 200, may include the utilization of software to enable detection after the power on sequence of the multi-interface IC 110. In this case, if the USB host 120 is present, the status register DSR 113 will be set to one and the CPU may receive a CPU interrupt to process the request to begin the USB data transfer with the USB host 120. This may improve CPU processing efficiency and bandwidth.

Additionally, the DEn block 114 could be suppressed, and the gate of N1 connected directly to a supply voltage. In this scenario, transistors P1, P2, and P3 will be turned on at all times and, therefore, the level detection block 112 will be performing detection for the USB host 120. An advantage to this approach is that software configured to turn on and off the DEn block 114 would not be required.

Although the features and elements of the present invention are described in the example embodiments in particular combinations, each feature or element can be used alone without the other features and elements of the example embodiments or in various combinations with or without other features and elements of the present invention. The present invention may be implemented in a computer program or firmware tangibly embodied in a computer-readable storage medium having machine readable instructions for execution by a machine, a processor, and/or any general purpose computer for use with or by any non-volatile memory device. Suitable processors include, by way of example, both general and special purpose processors.

Typically, a processor will receive instructions and data from a read only memory (ROM), a RAM, and/or a storage device having stored software or firmware. Storage devices suitable for embodying computer program instructions and data include all forms of non-volatile memory, including by way of example semiconductor memory devices, read only memories (ROMs), magnetic media such as internal hard disks and removable disks, magneto-optical media, and optical media such as CD-ROM disks and digital versatile disks (DVDs). Types of hardware components, processors, or machines which may be used by or in conjunction with the present invention include Application Specific Integrated Circuits (ASICs), Field Programmable Gate Arrays (FPGAs), microprocessors, or any integrated circuit.

What is claimed is:

1. A multi-interface integrated circuit (IC), comprising:
a plurality of transistors, wherein at least one transistor of the plurality of transistors is in communication with a first terminal and either a first or a second lead of the multi-interface IC, and at least one other of the plurality of transistors is in communication with the first terminal and a second terminal and either the first or second lead of the multi-interface IC;
a level detection block in communication with at least one of the plurality of transistors and the first and second leads, wherein the plurality of transistors includes at least one N metal oxide semiconductor (MOS) transistor and a plurality of PMOS transistors; and
a detection enable block wherein the at least one NMOS transistor is connected to the detection enable block, first terminal, and the plurality of PMOS transistors, and wherein a first PMOS transistor is in communication with the second terminal, a second PMOS transistor is in communication with the second terminal, second lead and the level detection block, and a third PMOS transistor is in communication with the second terminal, first lead and the level detection block.

2. The multi-interface IC of claim 1 wherein when the detection enable block is set to a first state, the plurality of transistors are switched on and the level detection block begins detecting for the presence of a USB host connection.

3. The multi-interface IC of claim 2 wherein the level detection block is configured to sample the first and second leads for a signal level.

4. The multi-interface IC of claim 3 wherein the level detection block is configured to set a detection status register to a first value if a low signal level is detected during sampling, and to a second value if a high signal level is detected.

5. The multi-interface IC of claim 4, further comprising clearing the detection status register if a high signal level is detected.

6. The multi-interface IC of claim 4 wherein a low signal level indicates a presence of the USB host connection and a high signal level indicates an absence of the USB host connection.

7. The multi-interface IC of claim 2, further comprising a central processing unit (CPU) configured to set the state of the detection enable block.

8. The multi-interface IC of claim 1 wherein the first terminal is a power supply terminal and the second terminal is a ground.

9. A multi-interface integrated circuit (IC), comprising:
an N metal oxide semiconductor (MOS) transistor, wherein the gate is connected to a first terminal, and the source is connected to a second terminal;
a first, second, and third PMOS transistor, wherein the gates of the first, second and third transistor are connected to the gates of one another and to the drain of the NMOS transistor, the sources of the first, second and third transistors are connected to the first terminal, the drain of the first PMOS is connected to the drain of the NMOS transistor, the drain of the second PMOS transistor is connected to a first lead of the multi-interface IC, and the drain of the third PMOS transistor is connected to a second lead of the multi-interface IC; and
a level detection block in communication with the first and second leads of the multi-interface IC and the drains of the second and third PMOS transistors.

10. The multi-interface IC of claim 9 wherein the level detection block is configured to sample first and second leads for a signal level.

11. The multi-interface IC of claim 10 wherein the level detection block is configured to set a detection status register to a first value if a low signal level is detected during sampling, and to a second value if a high signal level is detected.

12. The multi-interface IC of claim 11, further comprising clearing the detection status register if a high signal level is detected.

13. The multi-interface IC of claim 11 wherein a low signal level indicates a presence of the USB host connection and a high signal level indicates an absence of the USB host connection.

14. The multi-interface IC of claim 9 wherein the first terminal is a power supply terminal and the second terminal is a ground.

15. An apparatus configured to detect the presence of a universal series bus (USB) host connection to a multi-interface integrated circuit (IC), the apparatus comprising:
a computer readable storage medium, the computer readable storage medium configured to enable the detection the USB host connection, detect whether or not a low signal level or a high signal level is present on D+ and D− leads in the multi-interface IC, determine a connection status of the USB host to the multi-interface IC based upon the detection of the low signal level or high signal level, and set a detection status register based upon the determination of the connection status of the USB host to the multi-interface IC.

* * * * *